(12) United States Patent
Takada (10) Patent No.: US 7,430,687 B2
(45) Date of Patent: Sep. 30, 2008

(54) BUILDING-UP OF MULTI-PROCESSOR OF COMPUTER NODES (75) Inventor: Tatsuya Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 575 days.

(21) Appl. No.: 11/004,873

(22) Filed: Dec. 7, 2004

(65) Prior Publication Data
US 2005/0144506 A1 Jun. 30, 2005

(30) Foreign Application Priority Data
Dec. 9, 2003 (JP) ............................. 2003-410780

(51) Int. Cl.
G06F 11/00 (2006.01)
(52) U.S. Cl. ...................... 714/11; 714/10; 714/12; 714/4
(58) Field of Classification Search .................. 714/20, 714/10–12
See application file for complete search history.

(56) References Cited
U.S. PATENT DOCUMENTS 5,845,071 A * 12/1998 Patrick et al. ............... 709/215
6,199,179 B1 * 3/2001 Kauffman et al. ............ 714/26
6,401,174 B1 * 6/2002 Hagersten et al. ........... 711/147
6,499,117 B1 * 12/2002 Tanaka ........................ 714/49
6,842,870 B2 * 1/2005 Austen et al. ................ 714/48
7,146,533 B2 * 12/2006 Lindsay et al. ............... 714/20
2004/0153770 A1 * 8/2004 Lindsay et al. ............... 714/20

FOREIGN PATENT DOCUMENTS

| JP | 8-6909 | 1/1996 |
|----|--------|--------|
| JP | 8-263329 | 10/1996 |
| JP | 11-212836 | 8/1999 |
| JP | 2000-194584 | 7/2000 |
| JP | 2001-109702 | 4/2001 |
| JP | 2002-91938 | 3/2002 |

* cited by examiner

Primary Examiner—Yolanda L Wilson
(74) Attorney, Agent, or Firm—McGinn IP Law Group, PLLC (57) ABSTRACT In an aspect of the present invention, a computer system includes a plurality of computer nodes and an inter-node connecting unit configured to connect the plurality of computer nodes. Each of the plurality of computer nodes includes a local memory configured to store fault data of the computer node and a main memory. When a coupling command is issued to the plurality of computer nodes to build up a multi-processor in which the plurality of computer nodes are coupled, each of the plurality of computer nodes writes the fault data of the computer node in a predetermined address of the main memory of the computer node.

18 Claims, 6 Drawing Sheets

BUILDING-UP OF MULTI-PROCESSOR OF COMPUTER NODES

BACKGROUND OF THE INVENTION

1. Field of the Invention

The present invention relates to a computer system, and more particularly relates to a computer system in which a plurality of computer nodes are coupled to build up a single multi-processor.

2. Description of the Related Art

Recently, a parallel computer system is practiced in which a plurality of computer nodes capable of operating independently are coupled to build up a tightly coupled multi-processor. The parallel computer system has advantages of facility of operation and management, high efficiency processing, and efficient usability of resources. One problem in such a parallel computer system is in appropriate management of fault data. To operate the parallel computer system appropriately, it is necessary for a processor to control the parallel computer system and to collectively manage the fault data of each computer node.

Japanese Laid Open Patent Application (JP-A-Heisei 8-263329) discloses a parallel computer system which integratedly manages fault data by using a service processor. The conventional parallel computer system includes the service processor in addition to a master processor and slave processors. The master processor, the slave processors, and the service processor are connected with each other through a diagnosis path. The diagnosis path is used only for management of the fault data. When a fault occurs in one of the slave processors, the slave processor stores a fault data (log data) in its own processor. The service processor reads out the fault data from the fault occurred slave processor through the diagnosis path and transfers the fault data to the master processor. Thus, the master processor can integratedly manage the fault data of the slave processors.

However, it is not preferable to provide a dedicated service processor in the light of costs. Especially, it is not preferable to provide such a service processor when computers designed in accordance with standard PC architecture such as PC/AT (Personal Computer/Advanced Technology) are used as computer nodes to realize a low-cost parallel computer system. In addition, it is necessary to adopt a management method of the fault data so as to overcome restraints due to the PC architecture.

When the computers designed in accordance with the standard PC architecture are used as the computer nodes, a tightly coupled multi-processor configured by coupling the computer nodes must also operate in accordance with the PC architecture. One of restraints in such a computer system is in that only one bridge circuit (typically, a south bridge) is permitted to connect the computer node and peripheral devices. This is an important constraint on the management of the fault data. In general, the fault data in each computer node is stored in non-volatile memory (NVRAM) managed by the south bridge of each computer node. However, after the computer nodes are coupled to each other to build up a multi-processor, the multi-processor can use only one south bridge. In the multi-processor, the south bridges other than the south bridge of a selected computer node cannot be used. Access to the NVRAM managed by the south bridge of the non-selected computer node is not permitted. This means that the tightly coupled multi-processor cannot refer to the fault data stored in the NVRAM managed by the non-selected south bridge after the coupling of the computer nodes. In other words, it means that the fault data are not succeeded to the tightly coupled multi-processor after the coupling of the computer nodes. This is a problem on proper operation of the tightly coupled multi-processor. The fault data in each computer node at the time of operation of the tightly coupled multi-processor must be succeeded to each computer node when the tightly coupled multi-processor has been separated. Therefore, the succession of the fault data is important when the tightly coupled multi-processor is separated into the computer nodes and each computer node initiates the operation independently.

For this reason, in the computer system in which a plurality of computer nodes are coupled to build up the tightly coupled multi-processor, it is required that proper management of the fault data of each computer node, e.g., proper succession of the fault data before and after the coupling and separation of the computer nodes can be realized in lower cost. Especially, it is desired to accomplish the requirement of the proper management while the constraints to the standard PC architecture are overcome.

In conjunction with the above description, Japanese Laid Open Patent Applications (JP-A-Heisei 11-212836, JP-A-2000-194584, JP-A-2001-109702, JP-A-2002-91938) disclose management techniques to collect fault data or system data from a plurality of computers. However, these applications never disclose concerning about succession of fault data between each of computer nodes and the tightly coupled multi-processor.

Also, a parallel computer system is disclosed in Japanese Laid Open Patent Application (JP-A-Heisei 8-6909). In this conventional parallel computer system, a single service processor controls a plurality of processors through a diagnosis path. Each of the plurality of processors has a log data acquiring section to acquire log data when a fault has occurred in the processor, and a storage circuit to store the log data. An error notifying circuit of the processor notifies the occurrence of the fault. A diagnosis path control circuit of the processor controls the diagnosis path. One of the plurality of processors as a specific processor has an interrupt analyzing section to receive the notice of the fault occurrence. In the specific processor, a log data receiving section of the specific processor reads out the log data from the service processor, and a log data write section stores the log data supplied from the log data receiving section. The service processor has a diagnosis path control circuit to control the diagnosis path. In the service processor, a node selecting section selects one processor which has issued a request through the diagnosis path, and a log data collecting section collects the log data from the selected processor. An error notifying section notifies the request received from the processor to a master processor.

SUMMARY OF THE INVENTION

An object of the present invention is to provide a commuter system which can succeed fault data before and after the coupling of a plurality of computer nodes.

Another object of the present invention is to provide a commuter system which can realize the succession of fault data regardless of PC architecture.

In an aspect of the present invention, a computer system includes a plurality of computer nodes and an inter-node connecting unit configured to connect the plurality of computer nodes. Each of the plurality of computer nodes includes a local memory configured to store fault data of the computer node and a main memory. When a coupling command is issued to the plurality of computer nodes to build up a multi-processor in which the plurality of computer nodes are coupled, each of the plurality of computer nodes writes the fault data of the computer node in a predetermined address of the main memory of the computer node.

Here, one of the plurality of computer nodes may be selected as a bootstrap processor. At this time, the bootstrap processor may restructure a main memory area for the multi-processor based on a portion of a memory area of the main memory in each of the plurality of computer nodes, and the memory area portion contains the fault data of the computer node.

In this case, each of the plurality of computer nodes other than the bootstrap processor uses the memory area other than the portion of the memory area of the main memory. Also, the bootstrap processor may store the fault data of each of the plurality of computer nodes on the main memory area in the local memory of the bootstrap processor through the inter-node connecting unit.

Also, each of the plurality of computer nodes may further include a bridge circuit provided between the main memory and the local memory. The bootstrap processor may inactivate the bridge circuit in each of the plurality of computer nodes other than the bootstrap processor while keeping the bridge circuit of the bootstrap processor to an active state.

Also, the bootstrap processor may store new fault data in the local memory of the bootstrap processor when the new fault data is generated while the multi-processor operates.

Also, when a separation command is issued to the plurality of computer nodes while the multi-processor operates, one of the plurality of computer nodes may be selected as a separation processing computer node. The separation processing computer node may read out all the fault data from the local memory of the bootstrap processor and stores the fault data corresponding to each of the plurality of computer nodes in the predetermined address of the main memory in the computer node. In this case, each of the plurality of computer nodes may store the fault data in the main memory of the computer node in the local memory of the computer node.

In another aspect of the present invention, an operation method of a computer system of a plurality of computer nodes, is achieved by issuing a coupling command to a plurality of computer nodes to build up a multi-processor in which the plurality of computer nodes are coupled; and by reading out fault data of the computer node from a main memory of the computer node to store in a predetermined address of a main memory of the computer node in each of the plurality of computer nodes.

Here, the operation method may be achieved by further including selecting one of the plurality of computer nodes as a bootstrap processor; and restructuring a main memory area for the multi-processor based on a portion of a memory area of the main memory in each of the plurality of computer nodes by the bootstrap processor, the memory area portion containing the fault data of the computer node.

Also, the operation method may be achieved by further including that each of the plurality of computer nodes other than the bootstrap processor uses the memory area other than the portion of the memory area of the main memory.

Also, the operation method may be achieved by further including storing the fault data of each of the plurality of computer nodes on the main memory area in the local memory of the bootstrap processor through the inter-node connecting unit.

Also, the operation method may be achieved by further including inactivating a bridge circuit in each of the plurality of computer nodes other than the bootstrap processor while keeping the bridge circuit of the bootstrap processor to an active state, the bridge circuit being provided between the main memory and the local memory in each of the plurality of computer nodes.

Also, the operation method may be achieved by further including storing new fault data in the local memory of the bootstrap processor when the new fault data is generated while the multi-processor operates.

Also, the operation method may be achieved by further including issuing a separation command to the plurality of computer nodes while the multi-processor operates; selecting one of the plurality of computer nodes as a separation processing computer node; and reading out all the fault data from the local memory of the bootstrap processor to store the read-out fault data corresponding to each of the plurality of computer nodes in the predetermined address of the main memory in the computer node by the separation processing computer node.

Also, the operation method may be achieved by further including storing the fault data in the main memory of each of the plurality of computer nodes in the local memory of the computer node.

Another aspect of the present invention relates to a computer readable software product executed by one of a plurality of computer nodes for a multi-processor, to carry out a method. The method is achieved by reading out fault data from a main memory to store in a predetermined address of a main memory in response to a coupling command; by restructuring, when the computer node is selected as a bootstrap processor, a main memory area for the multi-processor based on a portion of a memory area of a main memory in each of a plurality of computer nodes which includes the computer node, the memory area portion containing the fault data of the computer node; by storing the fault data of each of the plurality of computer nodes on the main memory area in the local memory; and by inactivating a bridge circuit in each of the plurality of computer nodes other than the computer node while keeping the bridge circuit of the computer node to an active state, the bridge circuit being provided between the main memory and the local memory in each of the plurality of computer nodes.

Also, the method may be achieved by further including reading out, when the computer node is selected as a separation processing computer node, all the fault data from the local memory in one of the plurality computer nodes selected as a bootstrap processor to store the read-out fault data corresponding to each of the plurality of computer nodes in the predetermined address of the main memory in each of the plurality of computer nodes; and storing the fault data in the main memory in the local memory.

BRIEF DESCRIPTION OF THE DRAWINGS

FIG. 6 is a block diagram showing the fault information shows the process of being taken over in each computer node from the close coupling multiprocessor in.

DESCRIPTION OF THE PREFERRED EMBODIMENTS

Hereinafter, a computer system of the present invention will be described in detail with reference to the attached drawings.

Figure 1:
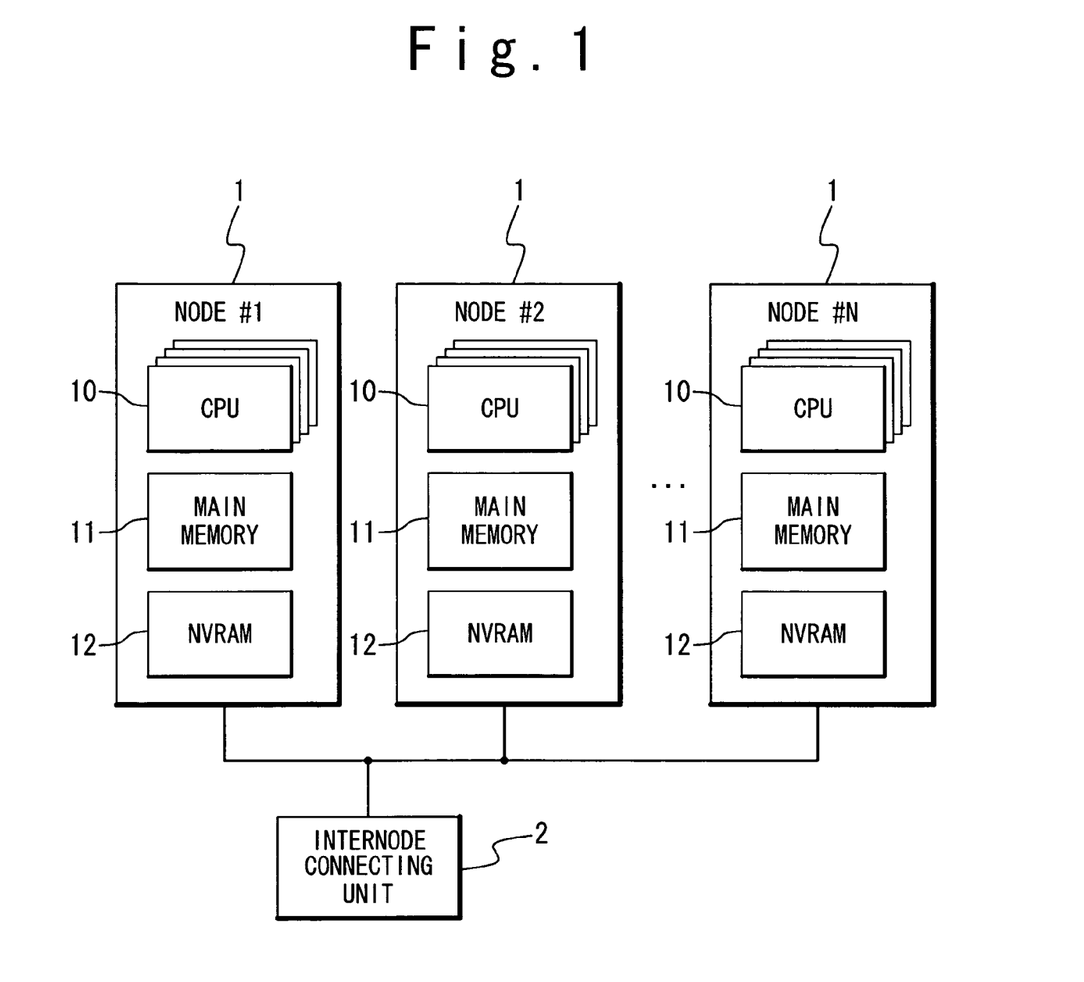
FIG. 1 is a block diagram showing the configuration of a computer system according to an embodiment of the present invention.

FIG. 1 is a block diagram showing a configuration of the computer system according to an embodiment of the present invention. Referring to FIG. 1, the computer system in this embodiment includes N computer nodes 1. Each of the computer nodes 1 is described as computer node #1, #2, ..., #N, when the computer nodes should be distinguished from each other. Each computer node 1 is an independently operable computer, and is designed in accordance with the PC architecture. The computer nodes 1 are connected by an inter-node connecting unit 2. A high-speed switch such as a crossbar switch is used as the inter-node connecting unit 2. Therefore, the computer nodes 1 build up a tightly coupled multi-processor which operates in accordance with PC architecture.

Figure 2:
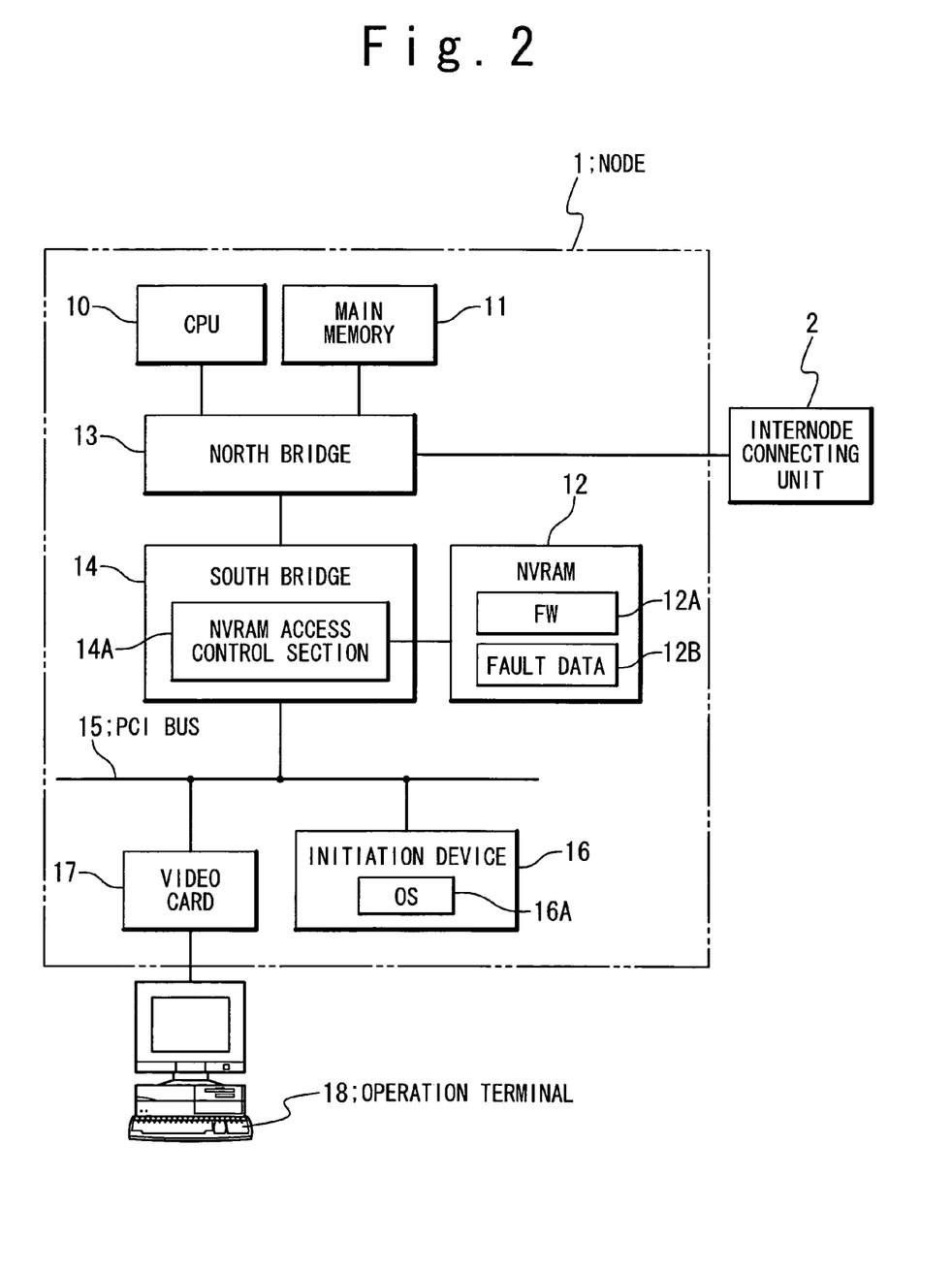
FIG. 2 is a block diagram showing the configuration of a computer node of the computer system of this embodiment.

As shown in FIG. 2, each computer node 1 includes a CPU 10, a main memory 11, a non-volatile memory (NVRAM) 12 as a local memory, a north bridge 13, a south bridge 14, and a PCI (Peripheral Component Interconnect) bus 15. The main memory 11 provides a main memory area to the computer node 1. The north bridge 13 connects the CPU 10 and the main memory 11 to allow data transfer to be carried out between them. Also, the north bridge 13 is connected with the inter-node connecting unit 2 to allow the computer node to communicate with each of the other computer nodes 1 through the north bridges 13 of the computer node. Tight coupling between the computer nodes 1 is achieved through the connection between the north bridges 13 of the computer nodes 1 through the inter-node connecting unit 2. Also, the north bridge 13 is connected with the south bridge 14. The south bridge 14 allows data transfer to be carried out between the north bridge 13 and the PCI bus 15. The south bridge 14 has an NVRAM access controller 14A and can access the NVRAM 12. As widely known to a person skilled in the art, the north bridge 13 and the south bridge 14 may be separately installed as different semiconductor devices, or may be installed as a single semiconductor device.

The NVRAM 12 stores firmware (FW) 12A and fault data 12B of the computer node 1. The firmware 12A includes a software program to control initiation of the computer node 1, and the software program is executed in the initiation of the computer node 1. Also, the firmware 12A has a function to control the tight coupling and separation of the computer nodes 1. The fault data 12B indicates a content of fault in the computer node 1.

The PCI bus 15 is connected with various peripheral devices. For example, an initiation device 16 and a video card 17 are connected with the PCI bus 15. The initiation device 16 stores an OS (operating system) 16A for the computer node 1. A HDD (Hard Disk Drive) and CD-ROM drive exemplify the initiation device 16. The video card 17 is connected with an operation terminal 18 together with the PCI bus 15 to allow interaction between the operation terminal 18 and the computer node 1. A user can operate the computer node 1 by using the operation terminal 18. For instance, a firmware start screen is displayed on the operation terminal 18 when the firmware 12A is initiated, and a screen to operate the OS 16A is displayed when the OS 16A is initiated.

Figure 3:
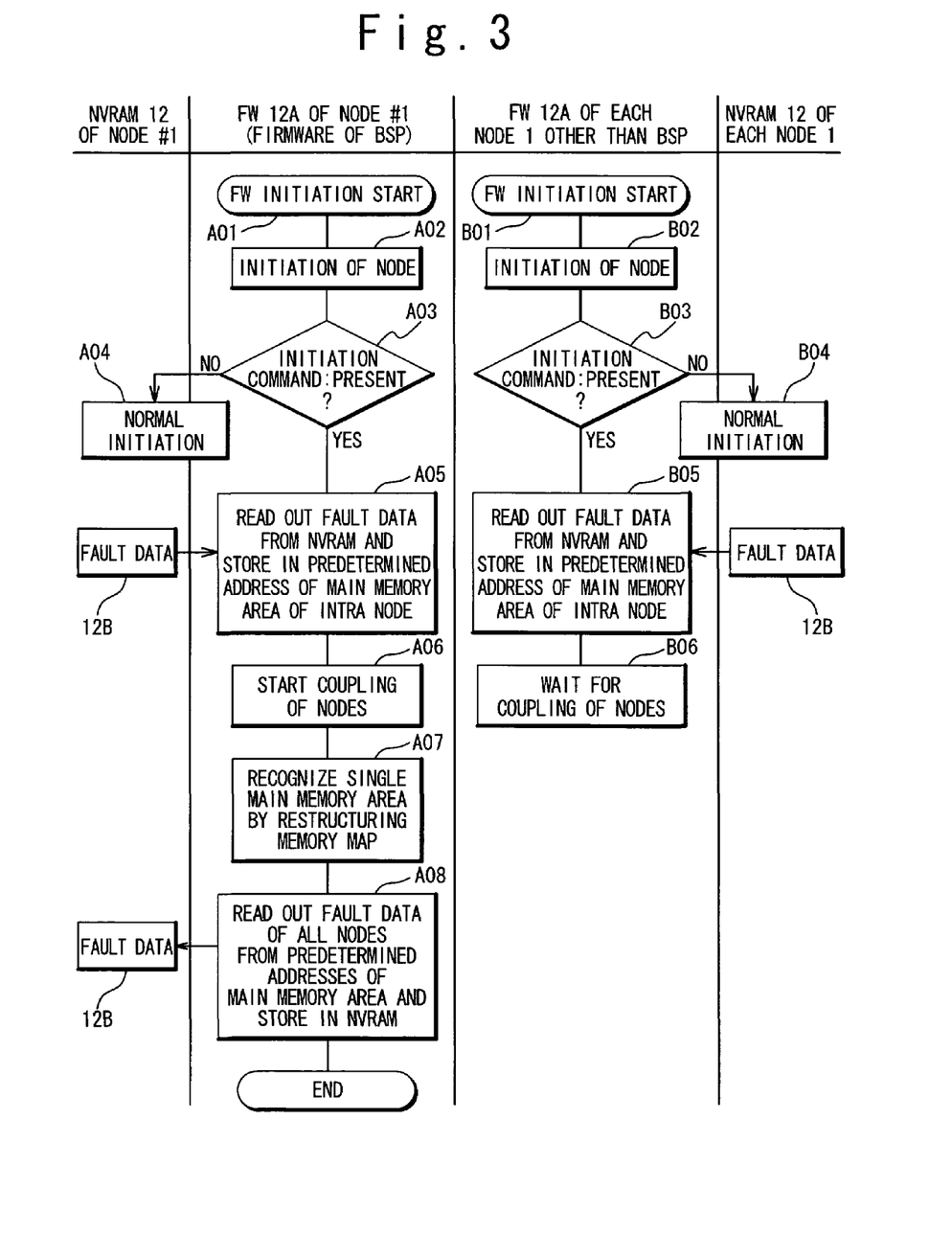
FIG. 3 is a flow chart showing an operation of the computer system in the coupling of the computer nodes.

Next, an operation of the computer system when the computer nodes 1 are tightly coupled will be described below. FIG. 3 is a flow chart of an operation of the computer system in the embodiment of the present invention when the computer nodes 1 are tightly coupled. When the computer system receives an initiation command, the firmware 12A of each of the computer nodes 1 is initiated in response to the initiation command (Steps A01 and B01). The firmware 12A carries out an initiation process for the computer node 1 (Steps A02 and B02).

In the initiation process, the firmware 12A of each computer node 1 determines whether the computer nodes 1 should be coupled to each other (Steps A03 and B03). Some methods are available to request to couple the computer nodes. For instance, a switch (not shown) may be provided for the computer system independently from the computer nodes 1 to request the coupling and separation of the computer nodes 1. In this case, it is possible to request the coupling of the computer nodes 1 by the switch. Also, a management controller other than the computer nodes 1 may be provided in the computer system. In this case, the firmware 12A of each computer node 1 inquires to the management controller, to determine whether the computer nodes 1 should be coupled.

When the coupling of the computer nodes is not requested, the firmware 12A of each computer node 1 carries out a normal initiation process (Steps A04 and B04).

On the other hand, when the coupling instruction is issued, the firmware 12A of each computer node 1 starts a succession process of the fault data 12B to the tightly coupled multi-processor built up by the computer nodes 1. In the succession process of the fault data 12B, the firmware 12A of each computer node 1 reads out the fault data 12B from the NVRAM 12 of the intra computer node 1 and stores the read fault data 12B in a predetermined address of the main memory area of the intra computer node 1 (Steps A05 and B05).

Next, one of the computer nodes 1 is selected. In this example, the computer node #1 is selected. The selected computer node #1 is referred to as a BSP (bootstrap processor) hereinafter. The selected computer node #1 starts a process of coupling the computer nodes 1 to build up the tightly coupled multi-processor (Steps A06 to A08). The computer nodes 1 other than the BSP wait for the multiprocessor to be built up by coupling of the computer nodes 1. (Step B06). Various methods are available to select the computer node #1 to specify the BSP. For instance, a computer node 1 having the smallest computer node number may be selected as the BSP. Also, the initiation command issued to each computer node 1 in the step A01 and B01 may include data to specify the BSP.

In the process to build up the tightly coupled multi-processor, the firmware 12A of the BSP issues a coupling instruction to the inter-node connecting unit 2 to couple the computer nodes 1 (Step A06). The inter-node connecting unit 2 couples the computer nodes 1 in response to the coupling instruction.

Figure 4:
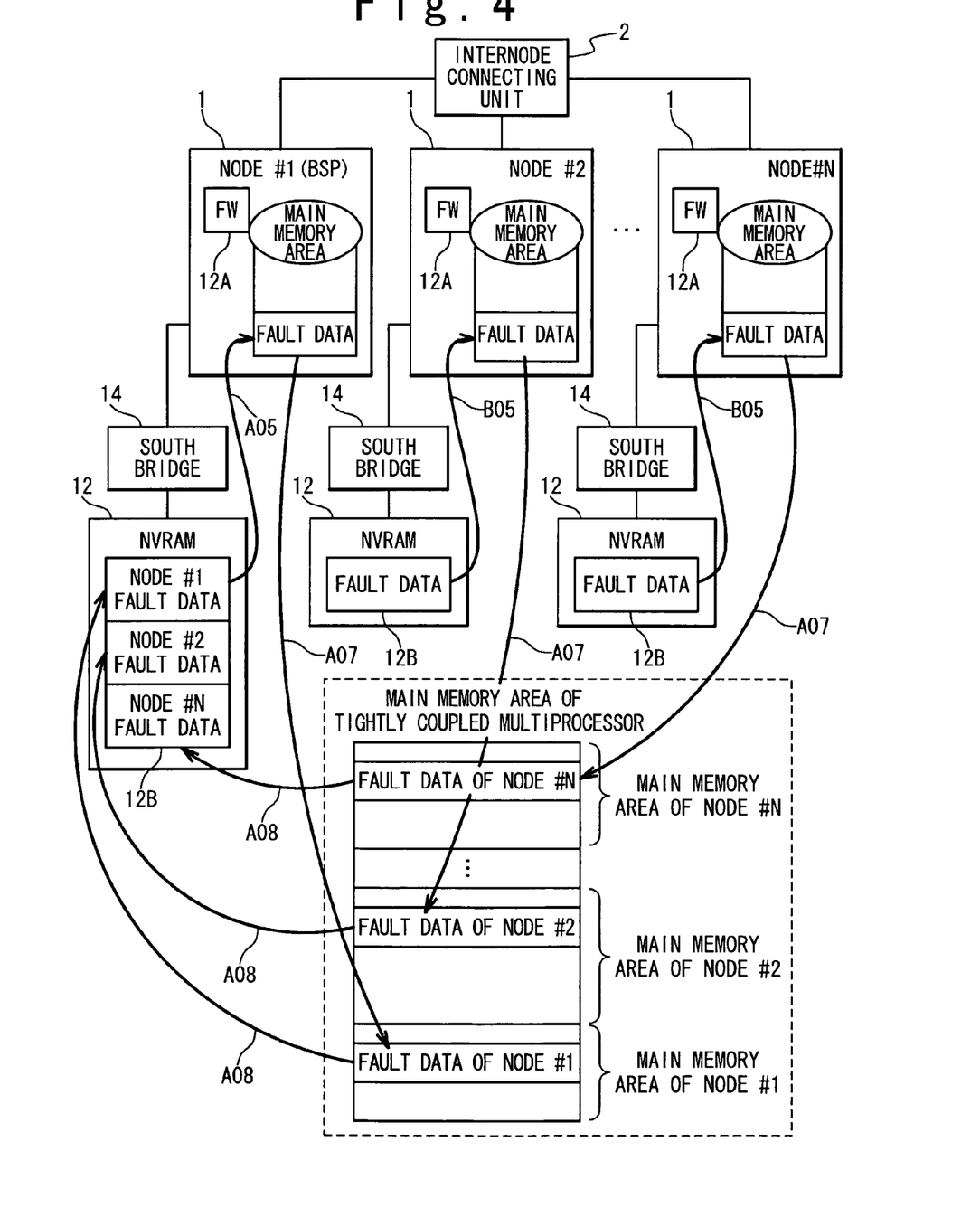
FIG. 4 is a block diagram showing the fault data shows the process of being taken over at the tightly coupled multi-processor from the computer node.

As shown in FIG. 4, the firmware 12A of the BSP restructures a memory map and recognizes the main memory 11 instructed in the coupling instruction as a single main memory for the whole computer system (Step A07). The recognized single main memory is used for a main memory area of the tightly coupled multi-processor built up through the coupling of the computer nodes 1. In this way, the firmware 12A of the BSP recognizes that the fault data 12B of the BSP is stored in the main memory area of the tightly coupled multi-processor. It should be noted that a total of memory areas of the main memories 11 of the computer nodes 1 needs not to be recognized as the main memory area of the tightly coupled multi-processor. That is, the firmware 12A of the BSP can select only a portion of the main memory 11 of each of the computer nodes 1. In this case, the selected portion includes the fault data 12B. Thus, it is possible to recognize the whole of selected portions as the main memory area of the tightly coupled multi-processor. This operation is effective to ensure a local memory area necessary for each computer node 1.

After the completion of restructuring the memory map, the firmware 12A of the BSP reads out the fault data 12B of each computer node 1 from each of predetermined addresses of the main memory area of the tightly coupled multi-processor. The firmware 12A of the BSP writes the read fault data 12B in the NVRAM 12 of the BSP through the south bridge 14 (Step A08). As a result, all the fault data 12B of the computer nodes 1 coupled to each other are stored in the NVRAM 12 of the BSP. It is important that the fault data 12B are stored in the predetermined address of the main memory area of each computer node 1 in the steps A05 and B05, in order to make it easy for the firmware 12A of the BSP to read out the fault data 12B from the main memory area of each of the computer nodes 1 coupled to each other in the step A08. In this way, the fault data 12B are stored in the predetermined address of the main memory area of each computer node 1, and the main memory area portions of the computer nodes 1 are recognized as the single main memory area of the tightly coupled multi-processor as a whole. As the result, the BSP is possible to previously recognize the addresses of the main memory area of the tightly coupled multi-processor where the fault data 12B are stored. This is preferable for the BSP to read the fault data 12B after the coupling of the computer nodes.

The firmware 12A of the BSP activates the south bridge 14 of the BSP, and inactivates the south bridges 14 of the computer nodes 1 other than the BSP. In this way, the built up tightly coupled multi-processor can refer all the fault data 12B of the computer nodes 1 coupled to each other. The tightly coupled multi-processor operates in accordance with the PC architecture thereafter.

In the embodiment, the fault data 12B of the computer nodes 1 coupled to each other may be stored in the NVRAM 12 in not the NVRAM 12 of the BSP but a selected one of the computer nodes 1 other than the BSP. In this case, the south bridge 14 of the selected computer node is activated in place of the south bridge 14 of the BSP, and the south bridge 14 of the BSP is inactivated.

Next, an operation when the tightly coupled multi-processor is separated will be described.

Figure 5:
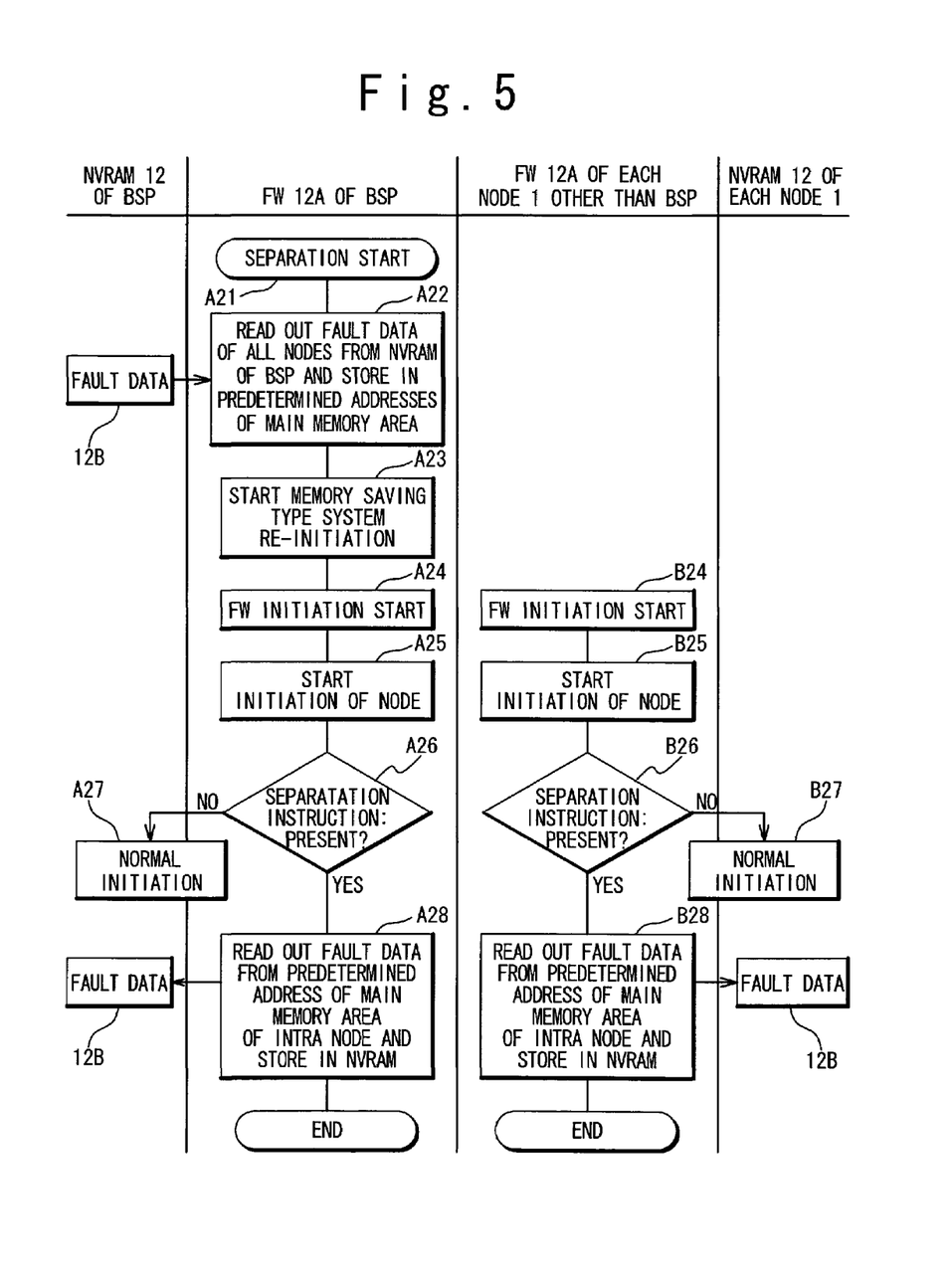
FIG. 5 is a flow chart showing the operation of the computer system in the separation of the tightly coupled multi-processor.

FIG. 5 is a flow chart showing the operation when the tightly coupled multi-processor. When an initiation command containing a separation command is issued to the computer system to separate the multiprocessor, one of the computer nodes 1 of the multi-processor is selected (the computer node #1 is selected in this example) and the firmware 12A of the selected computer node #1 starts a separation process to separate the tightly coupled multi-processor into each computer node 1 (Step A11). Hereafter, the selected computer node #1 is referred to a separation processing computer node. The separation processing computer node may be the same as the above-mentioned BSP or may be a different one.

Figure 6:
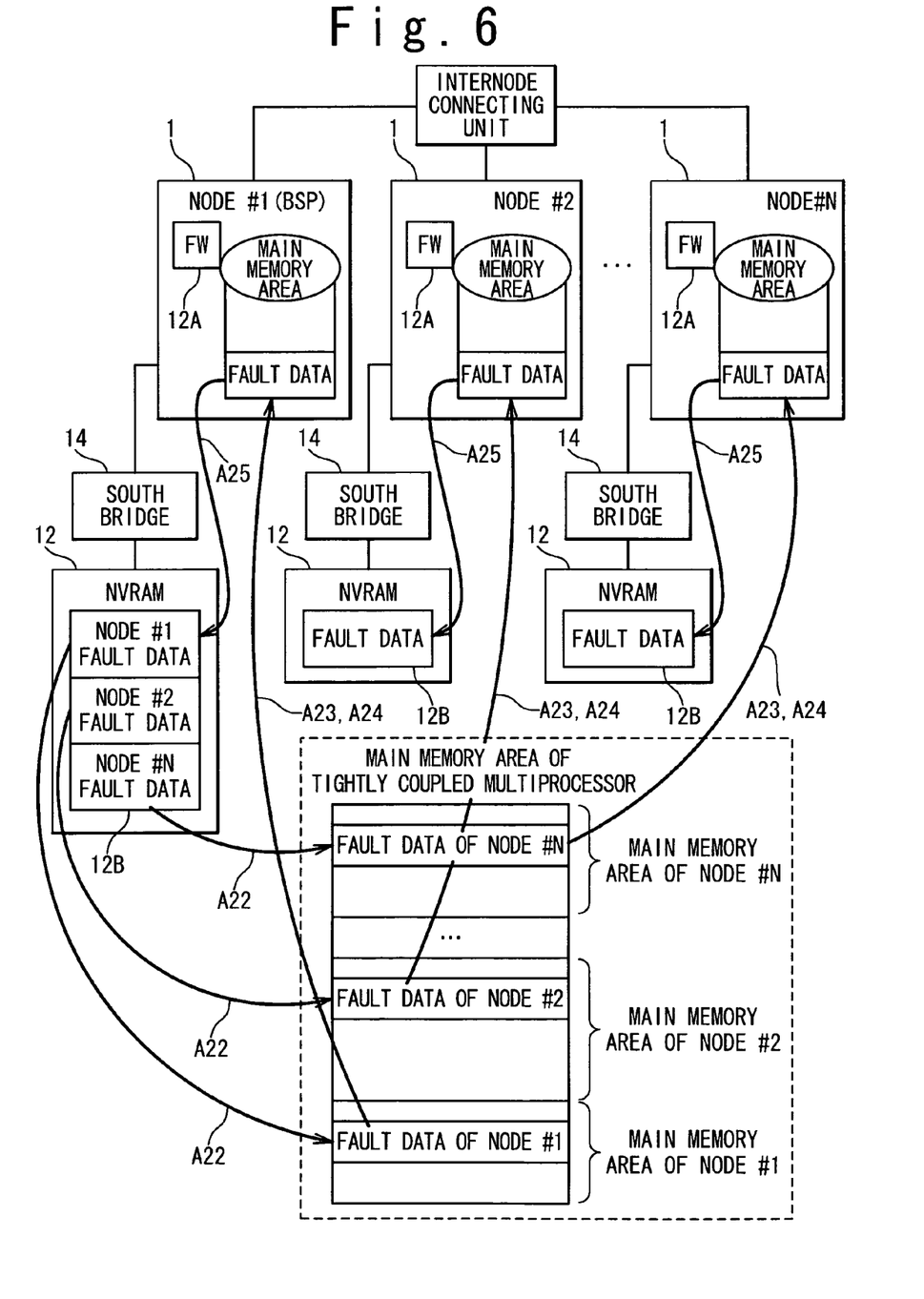

As shown in FIG. 6, the separation processing computer node reads out all the fault data 12B of the computer nodes 1 coupled to each other from the NVRAM 12 of the BSP through the south bridge 14. It should be noted that all of the fault data 12B of the computer nodes 1 has been written in the NVRAM 12 of the BSP in the coupling. The fault data 12B stored in the NVRAM 12 of the BSP include fault data occurred while the computer node 1 operates as the tightly coupled multi-processor. The separation processing computer node #1 stores each of the fault data 12B in address of the main memory area of the tightly coupled multi-processor (Step A22). The address where the fault data 12B of each computer node 1 is stored is predetermined so that each fault data 12B exists in a corresponding portion of the main memory 11 of each computer node 1 for the main memory area of the tightly coupled multi-processor.

Returning to FIG. 5 again, when the storage or relocation of all the fault data 12B in the main memory area is completed, the separation processing computer node issues a separation instruction to the inter-node connecting unit 2 to separate the computer nodes 1 from each other. The inter-node connecting unit 2 stops the transfer of the data between the coupled computer nodes 1 in response to the separation instruction.

In addition, the separation processing computer node controls all the computer nodes 1 to carry out a memory saving type system re-initiation (so-called a warm reboot) (Step A23). The firmware 12A of each computer node 1 is initiated in a state in which the data stored in the main memory 11 of the computer node 1 is kept, through the memory saving type re-initiation (Steps A24 and B24). The firmware 12A of each computer node 1 recognizes whether the fault data 12B of its own is stored in the main memory area of the multiprocessor, through the memory saving type re-initiation renders. Subsequently, the firmware 12A of each computer node 1 starts the initiation processes of the computer node 1 (Steps A25 and B25).

In the initiation process, the firmware 12A of each computer node 1 determines whether the separation of the tightly coupled multi-processor is requested (Steps A26 and B26). Various methods are available to request the separation. For instance, a switch may be provided in the computer system separately from the computer nodes 1 to request the coupling and separating of the computer nodes 1. The separation of the computer nodes may be requested through the switch. Also, a management controller may be provided in the computer system separately from the computer nodes 1. The firmware 12A can inquire the management controller whether the separation of the multiprocessor is requested.

When the separation of the multiprocessor (and, the coupling of the computer nodes) is not requested, the firmware 12A of each computer node 1 carries out a normal initiation process (the step A27 and B27).

On the other hand, when the separation of the multiprocessor is not requested, the firmware 12A of each computer node 1 reads out the fault data 12B from the main memory area of the computer node 1 to store in the NVRAM 12 of the computer node 1 (steps A28 and B28). It should be noted that data stored in the main memory area is not initialized in the memory saving type re-initiation. Thus, it is possible to succeed the fault data from the tightly coupled multi-processor to each computer node 1 when the tightly coupled multi-processor is separated through the above-mentioned process.

It is important that the succession of the fault data is carried out by the firmware 12A in this embodiment. The succession of the fault data by the firmware 12A unnecessitates a dedicated hardware for management of fault data, resulting in reducing cost.

As mentioned above, in the computer system of the present invention, the fault data can be smoothly succeeded between each computer node 1 and the tightly coupled multi-processor built up by the coupling of the computer nodes 1.

In the computer system of the present invention, the plurality of computer nodes are coupled to each other as the multiprocessor. The succession of the fault data before and after coupling of the computer nodes can be realized in low cost. Also, the succession of the fault data can be carried out without being contrary to the standard PC architecture.

What is claimed is:

1. A computer system comprising:
a plurality of computer nodes; and
an inter-node connecting unit configured to connect said plurality of computer nodes,
wherein each of said plurality of computer nodes comprises:
a local memory configured to store fault data of said computer node; and
a main memory, and
wherein a coupling command is issued to said plurality of computer nodes to build up a multi-processor in which said plurality of computer nodes are coupled, each of said plurality of computer nodes writes said fault data of said computer node in a predetermined address of said main memory of said computer node.

2. The computer system according to claim 1, wherein one of said plurality of computer nodes is selected as a bootstrap processor, and
said bootstrap processor restructures a main memory area for said multi-processor based on a portion of a memory area of said main memory in each of said plurality of computer nodes, the memory area portion containing said fault data of said computer node.

3. The computer system according to claim 2, wherein each of said plurality of computer nodes other than said bootstrap processor uses said memory area other than the portion of the memory area of said main memory.

4. The computer system according to claim 2, wherein said bootstrap processor stores said fault data of each of said plurality of computer nodes on said main memory area in said local memory of said bootstrap processor through said inter-node connecting unit.

5. The computer system according to claim 4, wherein said bootstrap processor stores new fault data in said local memory of said bootstrap processor when the new fault data is generated while said multi-processor operates.

6. The computer system according to claim 4, wherein when a separation command is issued to said plurality of computer nodes while said multi-processor operates, one of said plurality of computer nodes is selected as a separation processing computer node,
said separation processing computer node reads out all said fault data from said local memory of bootstrap processor and stores said fault data corresponding to each of said plurality of computer nodes in said predetermined address of said main memory in said computer node.

7. The computer system according to claim 6, wherein each of said plurality of computer nodes stores said fault data in said main memory of said computer node in said local memory of said computer node.

8. The computer system according to claim 1, wherein each of said plurality of computer nodes further comprises:
a bridge circuit provided between said main memory and said local memory,
said bootstrap processor inactivates said bridge circuit in each of said plurality of computer nodes other than said bootstrap processor while keeping said bridge circuit of said bootstrap processor to an active state.

9. An operation method of a computer system of a plurality of computer nodes, comprising:
issuing a coupling command to a plurality of computer nodes to build up a multi-processor in which said plurality of computer nodes are coupled; and
in each of said plurality of computer nodes, reading out fault data of said computer node from a local memory of said computer node to store in a predetermined address of a main memory of said computer node.

10. The operation method according to claim 9, further comprising:
select one of said plurality of computer nodes as a bootstrap processor; and
restructuring a main memory area for said multi-processor based on a portion of a memory area of said main memory in each of said plurality of computer nodes by said bootstrap processor, the memory area portion containing said fault data of said computer node.

11. The operation method according to claim 10, further comprising:
each of said plurality of computer nodes other than said bootstrap processor using said memory area other than the portion of the memory area of said main memory.

12. The operation method according to claim 10, further comprising:
storing said fault data of each of said plurality of computer nodes on said main memory area in said local memory of said bootstrap processor through said inter-node connecting unit.

13. The operation method according to claim 12, further comprising:
storing new fault data in said local memory of said bootstrap processor when the new fault data is generated while said multi-processor operates.

14. The operation method according to claim 12, further comprising:
issuing a separation command to said plurality of computer nodes while said multi-processor operates;
selecting one of said plurality of computer nodes as a separation processing computer node; and
reading out all said fault data from said local memory of said bootstrap processor to store said read-out fault data corresponding to each of said plurality of computer nodes in said predetermined address of said main memory in said computer node by said separation processing computer node.

15. The operation method according to claim 14, further comprising:
storing said fault data in said main memory of each of said plurality of computer nodes in said local memory of said computer node.

16. The operation method according to claim 10, further comprising:
inactivating a bridge circuit in each of said plurality of computer nodes other than said bootstrap processor while keeping said bridge circuit of said bootstrap processor to an active state, said bridge circuit being provided between said main memory and said local memory in each of said plurality of computer nodes.

17. A computer readable storage medium comprising computer readable instructions which when executed by one of a plurality of computer nodes for a multi-processor, carry out a method, said method comprising:
reading out fault data from a local memory to store in a predetermined address of a main memory in response to a coupling command;
when said computer node is selected as a bootstrap processor, restructuring a main memory area for said multi-processor based on a portion of a memory area of a main memory in each of plurality of computer nodes which includes said computer node, the memory area portion containing said fault data of said computer node;

storing said fault data of each of said plurality of computer nodes on said main memory area in said local memory; and inactivating a bridge circuit in each of said plurality of computer nodes other than said computer node while keeping said bridge circuit of said computer node to an active state, said bridge circuit being provided between said main memory and a local memory in each of said plurality of computer nodes.

18. The medium according to claim 17, wherein said method further comprises:

when said computer node is selected as a separation processing computer node, reading out all said fault data from said local memory in one of said plurality computer nodes selected as a bootstrap processor to store said read-out fault data corresponding to each of said plurality of computer nodes in said predetermined address of said main memory in each of said plurality of computer nodes; and storing said fault data in said main memory in said local memory.

* * * * *